(12) United States Patent
Liao

(10) Patent No.: US 6,515,654 B1
(45) Date of Patent: Feb. 4, 2003

(54) TOUCH-TYPE POINTING DEVICE WITH WIRELESS INPUT CAPABILITY

(75) Inventor: Cheng-Yuan Liao, Taoyuan (TW)

(73) Assignee: Taiwan Regular Electronics, Taoyuan (TW)

( * ) Notice: Subject to any disclaimer, the term of this patent is extended or adjusted under 35 U.S.C. 154(b) by 223 days.

(21) Appl. No.: 09/687,425

(22) Filed: Oct. 13, 2000

(51) Int. Cl.[7] .................................................. G09G 5/00
(52) U.S. Cl. ........................ 345/173; 345/174; 345/179; 178/18.01; 178/18.03; 178/18.05; 178/18.06; 178/19.01; 178/19.03
(58) Field of Search ................................ 345/173, 174, 345/179; 178/18.01, 18.03, 18.05, 18.06, 19.01, 19.03

(56) References Cited

U.S. PATENT DOCUMENTS

| | | | | |
|---|---|---|---|---|
| 4,678,869 A | * | 7/1987 | Kable ....................... | 178/18.05 |
| 5,194,852 A | * | 3/1993 | More et al. .............. | 178/18.03 |
| 5,455,574 A | * | 10/1995 | Itaya et al. .............. | 178/18.05 |

* cited by examiner

Primary Examiner—Bipin Shalwala
Assistant Examiner—Jimmy H. Nguyen
(74) Attorney, Agent, or Firm—Hamilton, Brook, Smith & Reynolds, P.C.

(57) ABSTRACT

A touch-type pointing device with wireless input capability is disclosed, which includes a touch unit and a sensing pen. The touch unit has a transparent electrode and a control circuit connected to the transparent electrode for detecting a variance of impedance in the transparent electrode to obtain a signal representing a coordinate point, and transmitting and receiving signals. The sensing pen has a plurality of switches, each being closed to form a LC loop for transmitting signals in response to the signals from the touch unit.

8 Claims, 7 Drawing Sheets

TOUCH-TYPE POINTING DEVICE WITH WIRELESS INPUT CAPABILITY

BACKGROUND OF THE INVENTION

1. Field of the Invention

The present invention relates to a touch-type pointing device with wireless input capability and, more particularly, to a touch-type pointing device having a sensing pen which is able to execute and confirm the operation of inputting coordinate point in wireless manner.

2. Description of Related Art

The touch pad is a well-known computer input device for providing functions similar to those of the mouse and track ball. As shown in FIG. 5, the touch pad 70 has a transparent electrode 71 and a plurality of buttons 72~74 for connecting to the control circuit (not shown) therein. The output of the control circuit is connected to the input port of a computer via conductive wires.

In use of the touch pad, a sensing pen 80 is provided to touch a coordinate point on the transparent electrode 71, so as to select a corresponding coordinate point on the computer screen. After the desired coordinate point is selected, the buttons 72~74 of the touch pad 70 are pressed to confirm and execute the input operation.

The above input operation is not convenient because the user must use both of his/her hands to hold the sensing pen 80 and press the buttons 72~74 of the touch pad 70 at the same time. Furthermore, the touch pad 70 is generally as small as a palm for the user to hold by one hand, and thus, it is not easy to have one hand hold the sensing pen 80 and the other hand press the buttons 72~74 while holding the touch pad 70. Therefore, there is a desired to have a novel touch-type pointing device to mitigate and/or obviate the aforementioned problems.

SUMMARY OF THE INVENTION

The object of the present invention is to provide a touch-type pointing device with wireless input capability for being conveniently operated by the user.

To achieve the object, the touch-type pointing device in accordance with the present invention includes a touch unit and a sensing pen. The touch unit has a transparent electrode and a control circuit connected to the transparent electrode for detecting a variance of impedance in the transparent electrode to have a signal representing a coordinate point, and transmitting and receiving signals. The sensing pen has a plurality of switches, each being closed to form a LC loop for transmitting signals in response to the signals from the touch unit.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
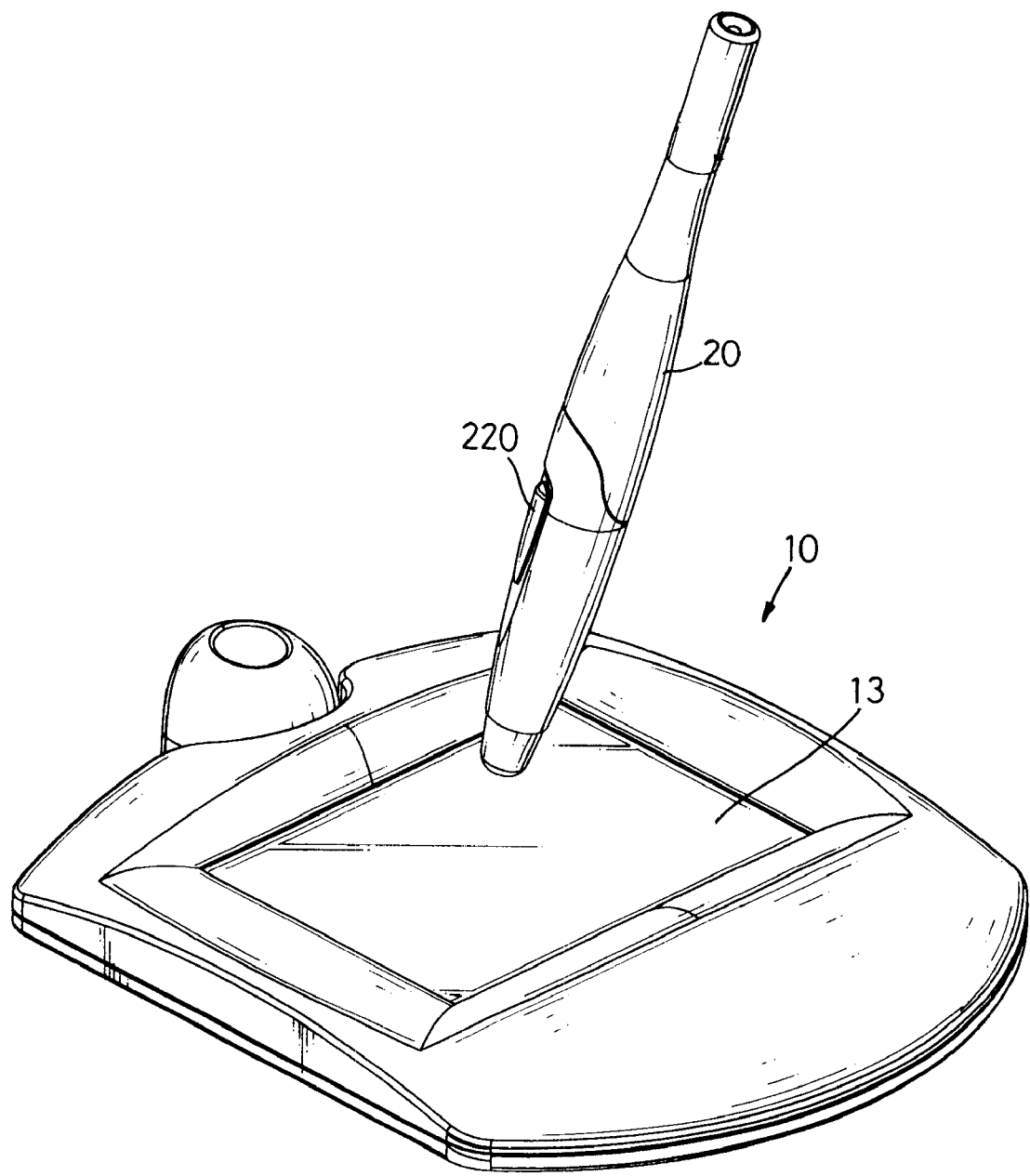
FIG. 1 is a perspective view of the touch-type pointing device in accordance with the present invention.
Figure 2:
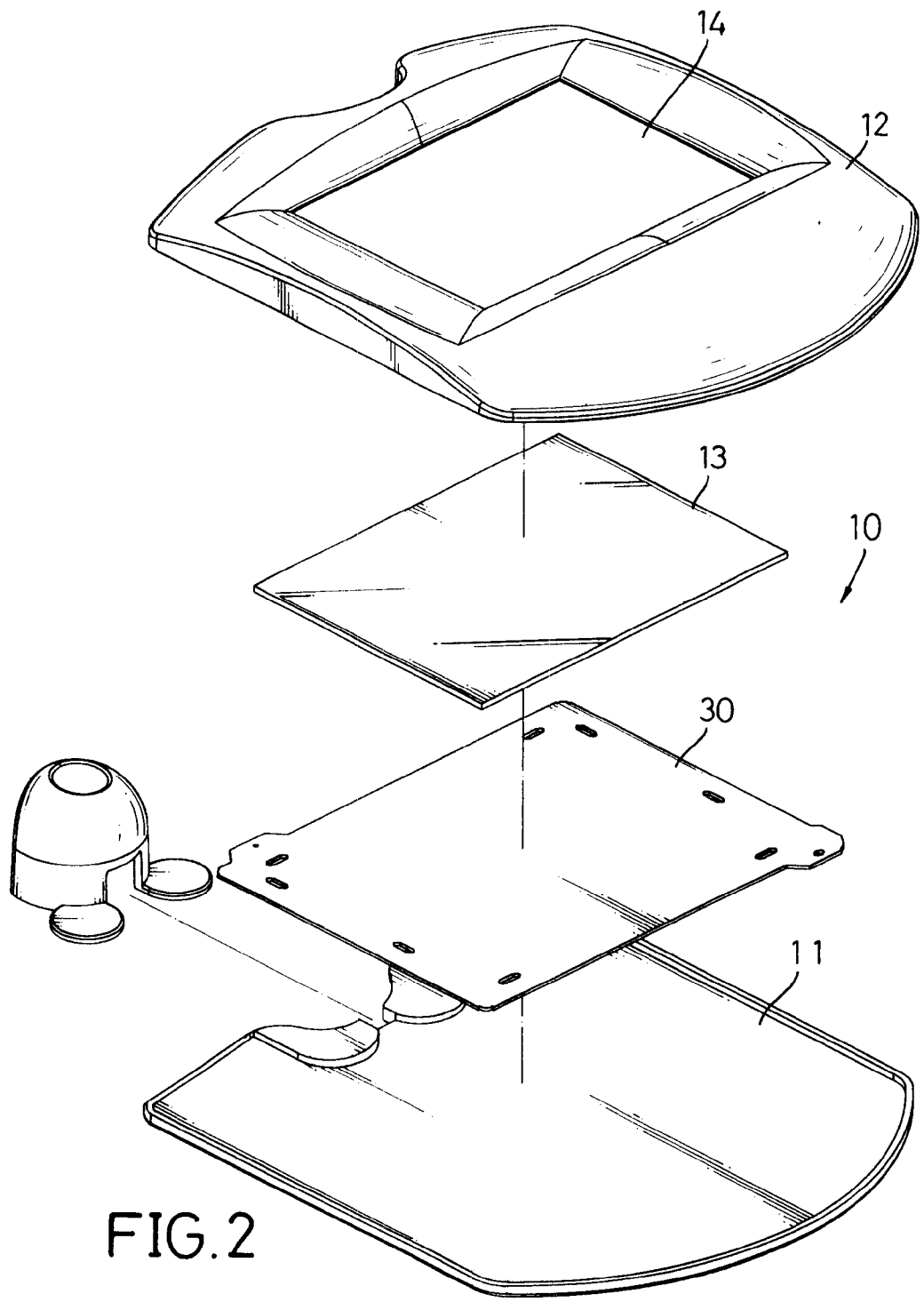
FIG. 2 is an exploded view of the touch-type pointing device in accordance with the present invention.

FIG. 1 shows a touch-type pointing device with wireless input capability in accordance with a preferred embodiment of the present invention, which includes a touch unit 10 and a sensing pen 20. The touch-type pointing device can be a touch pad device, a touch screen, or the like. In this preferred embodiment, the touch-type pointing device is implemented as a touch pad device. Therefore, the touch unit 10 is implemented as a touch pad which includes, as shown in FIG. 2, a bottom shell 11, an upper shell 12 for combining with the corresponding bottom shell 11, a control circuit 30 disposed between the bottom shell 11 and the upper shell 12, and a transparent electrode 13 connected to the input of the control circuit.

The upper shell 12 defines a window 14 having a predefined dimension, such that the transparent electrode 13 can be exposed via the window 14 for being touch and pressed by the sensing pen 20.

The transparent electrode 13 can be of resistive type or capacitive type. In this preferred embodiment, a resistive type transparent electrode 13 is employed.

Figure 3A:
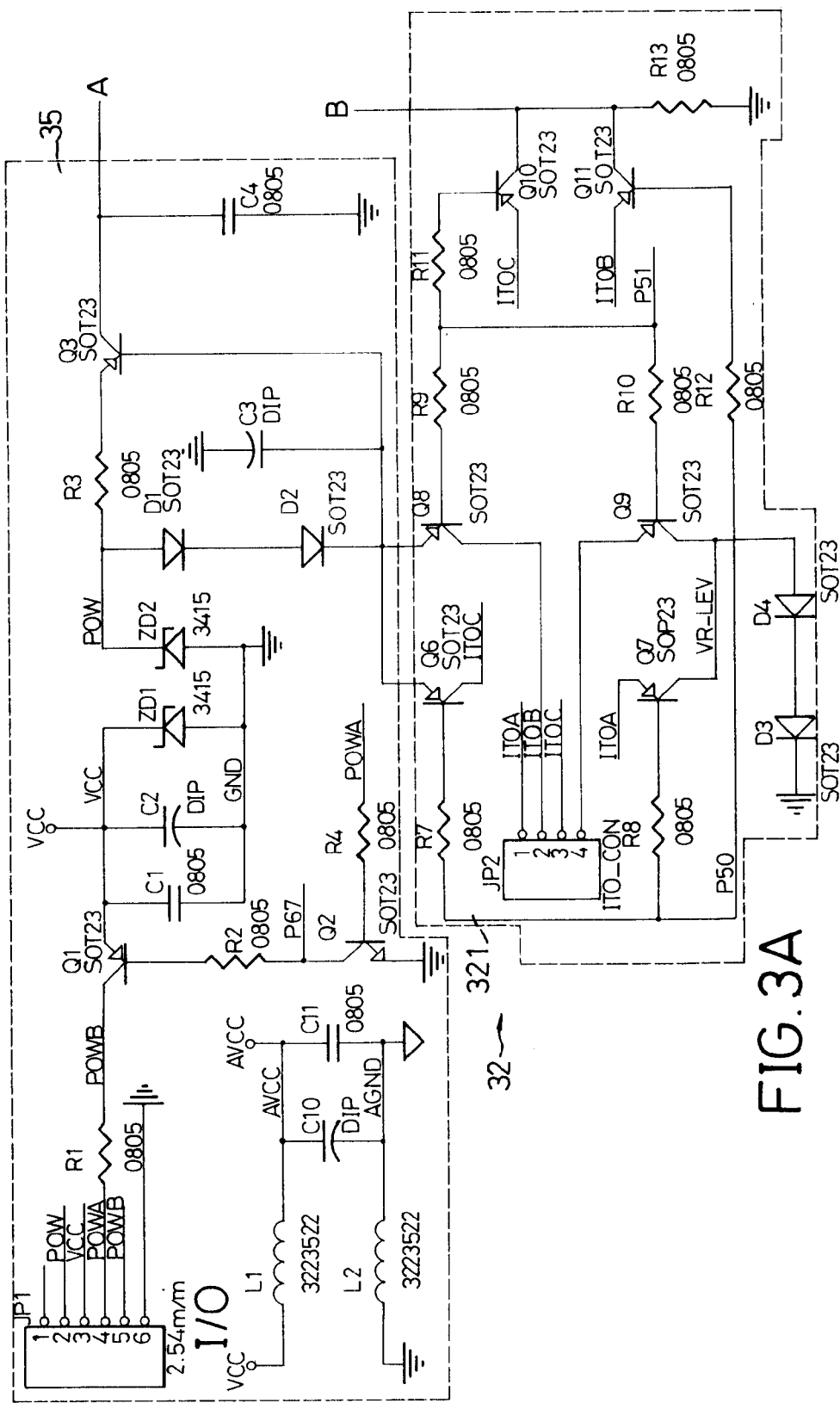
FIGS. 3A~3C are schematic diagrams of the control circuit in the touch unit in accordance with the present invention.
Figure 3B:
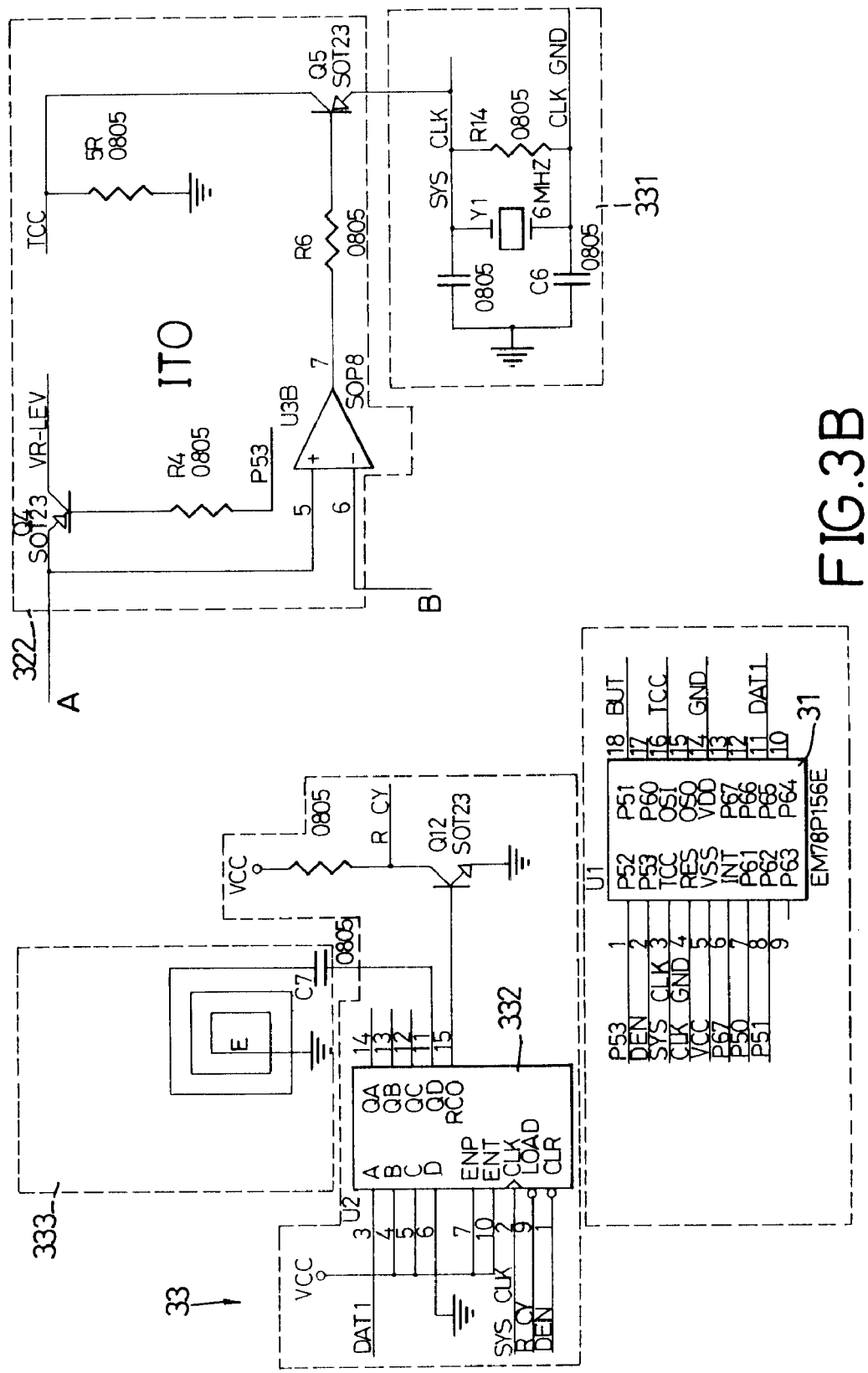
Figure 3C:
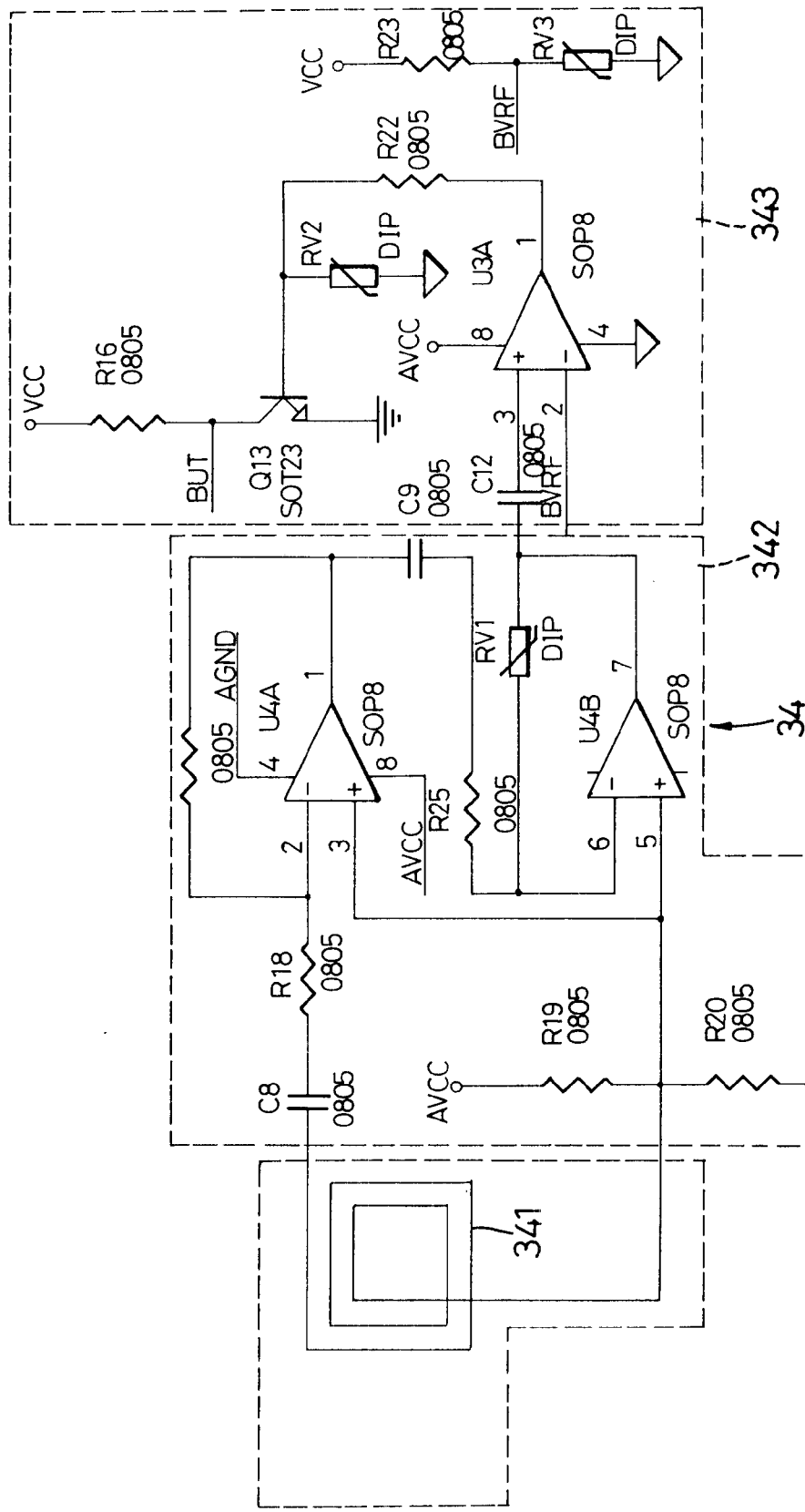

FIGS. 3A~3C show the schematic diagrams of the control circuit 30, in which a microprocessor 31 is provided. A transparent electrode converting circuit 32 is connected to the input pin TCC of the microprocessor 31 for detecting the variance of impedance in the transparent electrode 13. Thus, the microprocessor 31 is able to receive the signal representing the selected coordinate point and transmit the signal to the computer. A transmitting circuit 33 is connected to the output of the microprocessor 31, and controlled by the microprocessor 31 to generate at least one set of resonant signals. A receiving circuit 34 is connected to the input of the microprocessor 31 for receiving signals from the sensing pen 20. A power circuit 35 is connected to the computer via I/O interface for receiving power therefrom. The received power is stabilized and supplied to the above circuits.

The transparent electrode converting circuit 32 is composed of an impedance detecting circuit 321 and an A/D converting circuit 322, wherein the impedance detecting circuit 321 is connected to the transparent electrode 13 (not shown) via the connector JP2. The impedance detecting circuit 321 is composed of a plurality of transistors Q6~Q11 and resistors R7~R13. When the transparent electrode 13 is pressed at a specific position, the impedance is changed and converted into a voltage signal by the impedance detecting circuit 321. The voltage signal is further converted by the A/D converting circuit 322 into digital signal for being applied to the microprocessor 31. These transparent electrode 13 and transparent electrode converting circuit 322 are known to those skilled in the art and a detailed description is deemed unnecessary.

The transmitting circuit 33 is composed of an oscillator 331, a frequency divider 332 and a transmitting antenna 333. In addition to producing clock signal to the microprocessor 31, the oscillator 331 also produces clock signal for being processed by the frequency divider 332. After processing, signals with different frequencies are transmitted via the transmitting antenna 333. These signals are resonant with the circuit in the sensing pen 20.

The receiving circuit 34 is composed of a receiving antenna 341, a signal amplifying circuit 342 with filtering capability, and a comparing circuit 343. The receiving antenna 341 is provided to receive signals from the sensing pen 20. The received signal is amplified by the signal amplifying circuit 342 and confirmed by the comparing circuit 343 for being applied to the microprocessor 31. As such, the microprocessor 31 is able to send execution command to the computer.

In view of the foregoing, it is known that the control circuit 30 is characterized in that the microprocessor 31 is able to control the transmitting circuit 33 to alternatively generate multiple sets of signals with different frequencies. The signals are resonant with the circuit in the sensing pen 20, such that the sensing pen 20 can sense the energy of the signals and response a signal to the receiving circuit 34 which, in turn, produces an execution/confirmation command to the computer.

Figure 4:
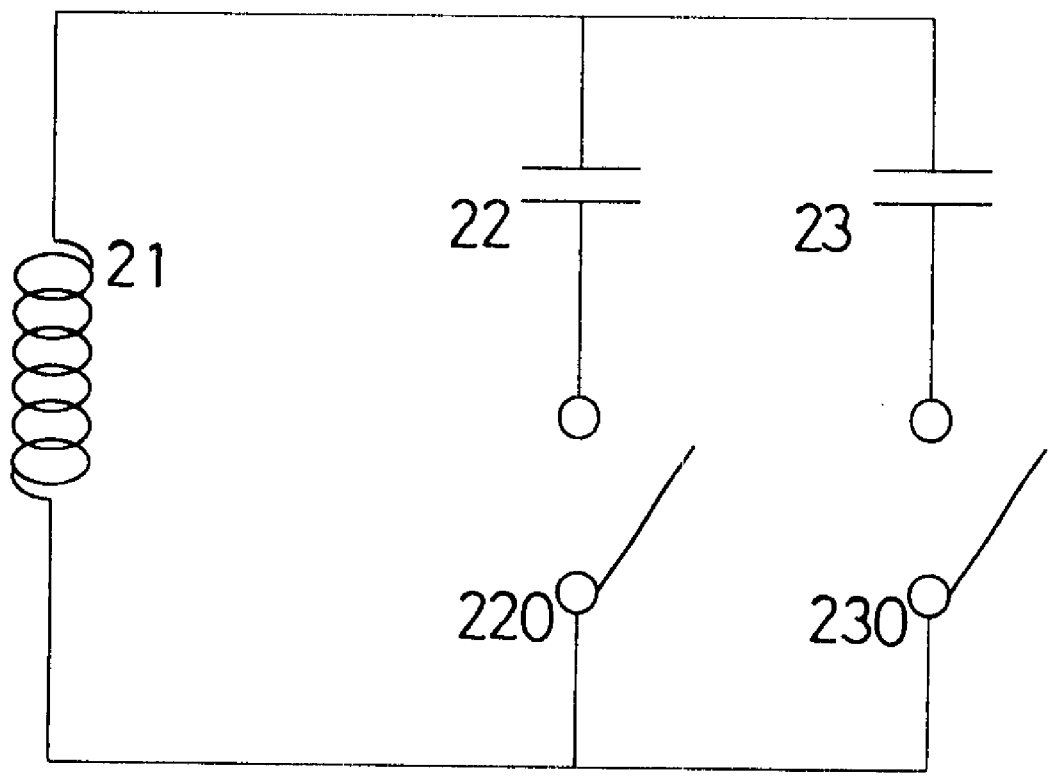
FIG. 4 is the circuit diagram of the sensing pen in accordance with the present invention.
Figure 5:
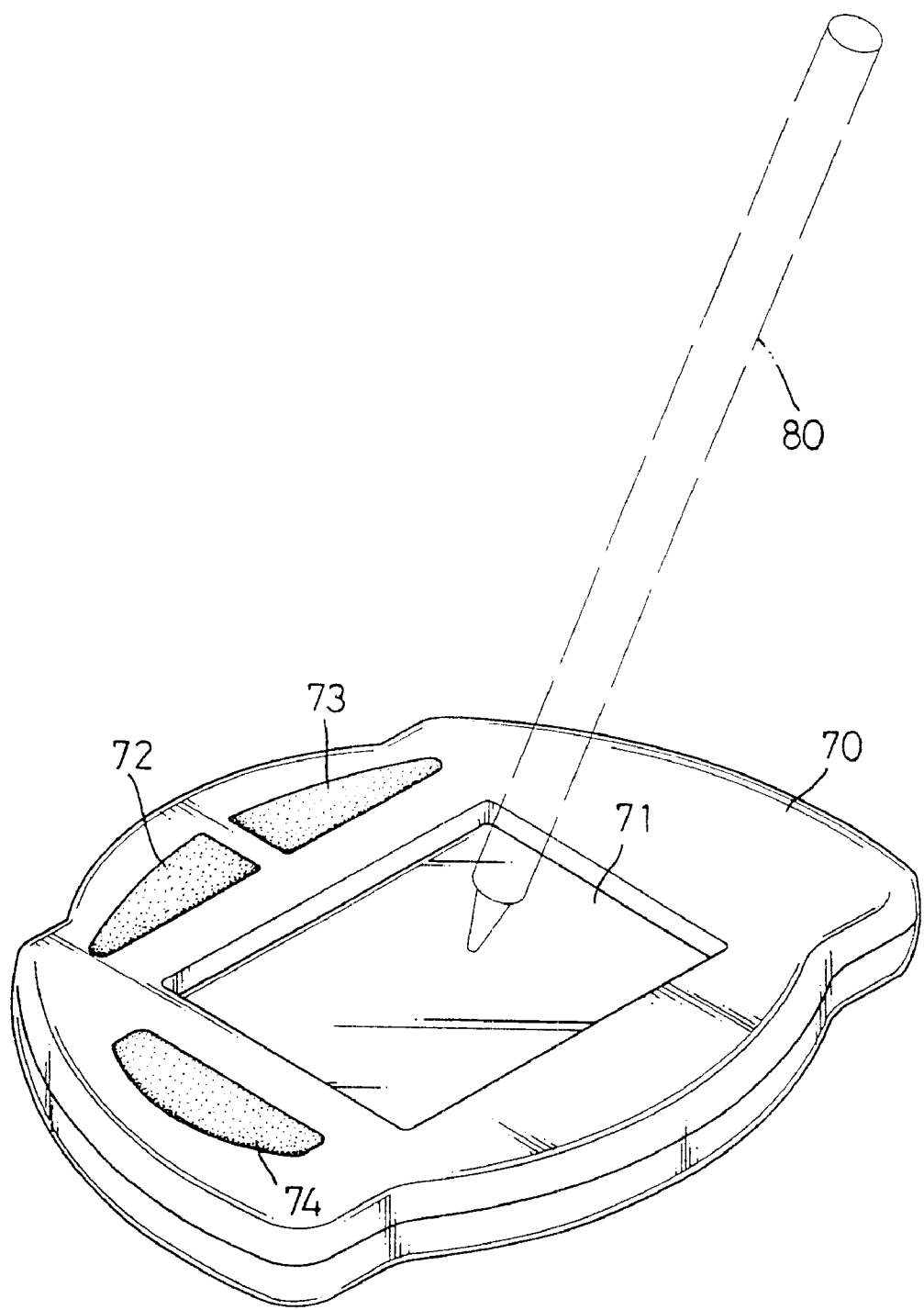
FIG. 5 schematically illustrates the use of a conventional touch pad.

FIG. 4 is the circuit diagram of the sensing pen 20, which includes a coil 21, and multiple, preferably two, capacitors 22 and 23 connected to the coil 21 in parallel. Two switches 220 and 230 are provided, and each is connected between the capacitor 22 or 23 and the coil 21. The switches are normally open, and when they are closed, the corresponding capacitor 22 or 23 and the coil 21 forms a LC loop. With such a circuit design, the coil 21 is energized by sensing signal transmitted from the transmitting circuit 33. When one of the switches 220 and 230 is closed, a LC loop is formed and thus a signal with specific frequency is transmitted via the coil 21 for being received by the receiving circuit 34. As such, the control circuit 30 is able to send various execution commands to the computer.

Therefore, in addition to the cursor movement function, the sensing pen 20 also has the click function, as provided by a general pointing input device, such as a mouse and track ball. Accordingly, the use of the touch unit is convenient. As shown in FIG. 1, the switch 220 is arranged on a holder portion of the sensing pen 20 (only one switch is shown). Thus, when the user holds the sensing pen 20, a click operation is easily accomplished by using the finger to touch the switch 220. Furthermore, because the distance between the sensing pen 20 and the touch unit 10 is short, the wireless communication therebetween will not impose an EMI influence to the electronic components.

In addition to the above preferred embodiment, the touch unit may be implemented as a touch screen, such that the user can use the sensing pen to select a coordinate point direct on the computer screen. In such an embodiment, the transparent electrode of the touch unit is of capacitive type.

Although the present invention has been explained in relation to its preferred embodiment, it is to be understood that many other possible modifications and variations can be made without departing from the spirit and scope of the invention as hereinafter claimed.

What is claimed is:

1. A touch-type pointing device with wireless input capability comprising:

a touch unit having a transparent electrode and a control circuit connected to the transparent electrode for detecting a variance of impedance in the transparent electrode to have a signal representing a coordinate point, and transmitting and receiving signals; and a sensing pen having a plurality of switches, each being closed to form a LC loop for transmitting signals in response to the signals from the touch unit.

2. The touch-type pointing device with wireless input capability as claimed in claim 1, wherein the control circuit comprises:

a microprocessor;

a transparent electrode converting circuit connected to an input pin of the microprocessor for detecting the variance of impedance in the transparent electrode, such that the microprocessor is able to receive the signal representing the selected coordinate point;

a transmitting circuit connected to an output of the microprocessor and controlled by the microprocessor to generate at least one set of resonant signals; and a receiving circuit connected to an input of the microprocessor for receiving signals from the sensing pen.

3. The touch-type pointing device with wireless input capability as claimed in claim 1, wherein the transparent electrode converting circuit is composed of an impedance detecting circuit and an A/D converting circuit.

4. The touch-type pointing device with wireless input capability as claimed in claim 1, wherein the transmitting circuit is composed of an oscillator, a frequency divider and a transmitting antenna.

5. The touch-type pointing device with wireless input capability as claimed in claim 1, wherein the receiving circuit is composed of receiving antenna, a signal amplifying circuit, and a comparing circuit having an output connected to the microprocessor.

6. The touch-type pointing device with wireless input capability as claimed in claim 2, wherein the sensing pen has a coil and multiple capacitors connected to the coil in parallel, and each capacitor is connected to the coil via a switch.

7. The touch-type pointing device with wireless input capability as claimed in claim 3, wherein the transparent electrode is of resistive type.

8. The touch-type pointing device with wireless input capability as claimed in claim 3, wherein the transparent electrode is of capacitive type.

* * * * *